United States Patent
Garnavi et al.

(10) Patent No.: US 10,726,555 B2
(45) Date of Patent: Jul. 28, 2020

(54) JOINT REGISTRATION AND SEGMENTATION OF IMAGES USING DEEP LEARNING

(71) Applicant: INTERNATIONAL BUSINESS MACHINES CORPORATION, Armonk, NY (US)

(72) Inventors: Rahil Garnavi, Melbourne (AU); Zongyuan Ge, Melbourne (AU); Dwarikanath Mahapatra, Melbourne (AU); Suman Sedai, Melbourne (AU)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/001,566

(22) Filed: Jun. 6, 2018

(65) Prior Publication Data
US 2019/0378274 A1 Dec. 12, 2019

(51) Int. Cl.
*G06N 3/08* (2006.01)
*G06T 7/00* (2017.01)
(Continued)

(52) U.S. Cl.
CPC .......... *G06T 7/0016* (2013.01); *G06N 3/086* (2013.01); *G06N 3/088* (2013.01); *G06T 7/174* (2017.01); *G06T 7/337* (2017.01); *G06T 7/38* (2017.01); *G06T 2207/10008* (2013.01); *G06T 2207/10081* (2013.01); *G06T 2207/10088* (2013.01); *G06T 2207/20081* (2013.01); *G06T 2207/20084* (2013.01)

(58) Field of Classification Search
CPC ......... G06T 7/0016; G06T 7/38; G06T 7/174; G06T 7/337; G06T 2207/10008; G06N 3/086; G06N 3/088
See application file for complete search history.

(56) References Cited

U.S. PATENT DOCUMENTS

| 5,633,951 A | 5/1997 | Moshfeghi |
| 6,611,615 B1 | 8/2003 | Christensen |

(Continued)

FOREIGN PATENT DOCUMENTS

| CN | 106846380 | 6/2017 |
| WO | WO 2017/091833 | 6/2017 |
| WO | WO 2017/158575 | 9/2017 |

OTHER PUBLICATIONS

English translation of CN106846380.

*Primary Examiner* — Gregory M Desire
(74) *Attorney, Agent, or Firm* — F. Chau & Associates, LLC (57) ABSTRACT

A system for registering and segmenting images includes an image scanner configured to acquire an image pair including a first image at a first time and a second image at a second time that is after the first time. A joint registration and segmentation server receives the image pair from the image scanner and simultaneously performs joint registration and segmentation on the image pair using a single deep learning framework. A computer vision processor receives an output of the joint registration and segmentation server and characterizes how a condition has progressed from the first time to the second time therefrom. A user terminal presents the characterization to a user.

20 Claims, 5 Drawing Sheets

(51) Int. Cl.
    *G06T 7/174*     (2017.01)
    *G06T 7/38*     (2017.01)
    *G06T 7/33*     (2017.01)

(56) References Cited

U.S. PATENT DOCUMENTS

| | | | |
|---|---|---|---|
| 8,064,664 B2 | 11/2011 | Suri et al. | |
| 8,777,854 B2 * | 7/2014 | Patwardhan | G06K 9/3241 |
| | | | 600/407 |
| 8,810,684 B2 | 8/2014 | Chang | |
| 9,179,890 B2 * | 11/2015 | Ionasec | A61B 8/12 |
| 9,259,151 B2 * | 2/2016 | Murase | A61B 3/102 |
| 9,406,142 B2 * | 8/2016 | Gorman, III | G06T 7/174 |
| 9,478,028 B2 * | 10/2016 | Parthasarathy | G06T 7/33 |
| 10,204,427 B2 * | 2/2019 | Zhang | G16H 40/40 |
| 2003/0065260 A1 * | 4/2003 | Cheng | A61B 8/0833 |
| | | | 600/427 |
| 2006/0056701 A1 | 3/2006 | Unal et al. | |
| 2008/0063301 A1 | 3/2008 | Bogoni et al. | |
| 2008/0095422 A1 | 4/2008 | Suri et al. | |
| 2011/0254950 A1 | 10/2011 | Bibby et al. | |
| 2014/0321727 A1 * | 10/2014 | Okizaki | G06K 9/2054 |
| | | | 382/131 |
| 2018/0042565 A1 * | 2/2018 | Wilson | G06T 7/13 |
| 2018/0070905 A1 * | 3/2018 | El-Baz | G06T 7/0016 |
| 2019/0303650 A1 * | 10/2019 | Liu | G06T 7/38 |

\* cited by examiner

FIG. 4

JOINT REGISTRATION AND SEGMENTATION OF IMAGES USING DEEP LEARNING

BACKGROUND

The present invention relates to image registration and segmentation and, more specifically, to joint registration and segmentation of images using deep learning.

Being able to track the progression of a disease is an important tool in providing healthcare. Medical images such as MRIs and CT scans taken over a period of time may be used to show the progression of a disease. However, it is difficult to automatically track and interpret the progression owing to problems associated with being able to register and segment the set of medical images that have been acquired over time.

Image registration is the process of interpreting several images to a common coordinate system. For example, where a set of medical images have been acquired over a period of time, it is unlikely that every image will show the same anatomy in the same relative location within the image frame. Registration may therefore be used to place every image into a common frame of reference so that the images may be used to show how a disease has progressed.

Image segmentation is the process of interpreting an image to identify the boundaries of one or more segments. For example, segmentation may be used to identify various landmarks and anatomical structures within the image.

Image segmentation results may be useful in performing image registration, as the various landmarks and anatomical structures, once identified, may be used to help establish how the segmented image should fit into the common set of coordinates. Accordingly, image segmentation is often performed before image registration.

SUMMARY

A system for registering and segmenting images includes an image scanner configured to acquire an image pair including a first image at a first time and a second image at a second time that is after the first time. A joint registration and segmentation server receives the image pair from the image scanner and simultaneously performs joint registration and segmentation on the image pair using a single deep learning framework. A computer vision processor receives an output of the joint registration and segmentation server and characterizes how a condition has progressed from the first time to the second time therefrom. A user terminal presents the characterization to a user.

A method for registering and segmenting images includes acquiring an image pair including a first image at a first time and a second image at a second time that is after the first time. Simultaneously, joint registration and segmentation are performed on the image pair using a single deep learning framework. The manner in which a condition has progressed from the first time to the second time is characterized from a result of the joint registration and segmentation of the image pair.

A computer program product for registering and segmenting images includes a computer readable storage medium having program instructions embodied therewith. The program instructions are executable by a computer to cause the computer to simultaneously performing, by the computer, joint registration and segmentation on an image pair using a single deep learning framework, the image pair including a first image at a first time and a second image at a second time that is after the first time, and characterizing, by the computer, how a condition has progressed from the first time to the second time from a result of the joint registration and segmentation of the image pair.

BRIEF DESCRIPTION OF THE SEVERAL VIEWS OF THE DRAWINGS

A more complete appreciation of the present invention and many of the attendant aspects thereof will be readily obtained as the same becomes better understood by reference to the following detailed description when considered in connection with the accompanying drawings, wherein.

DETAILED DESCRIPTION

In describing exemplary embodiments of the present invention illustrated in the drawings, specific terminology is employed for sake of clarity. However, the present invention is not intended to be limited to the illustrations or any specific terminology, and it is to be understood that each element includes all equivalents.

As discussed above, performing image segmentation may facilitate the subsequent performance of image registration, and therefore, image segmentation is often performed prior to performing image registration. However, exemplary embodiments of the present invention recognize that performing image registration may also facilitate the performance of image segmentation, as once an image is properly aligned to a common frame of reference, it can be known approximately where the various landmarks and anatomical structures should be located.

Thus, rather than performing image registration and image segmentation in sequence, exemplary embodiments of the present invention perform automated image registration and image segmentation concurrently as part of a single optimization problem so the performance of image registration may facilitate image segmentation as the performance of image segmentation facilitates image registration. This approach is referred to herein as joint registration and segmentation (JRS).

Figure 1:
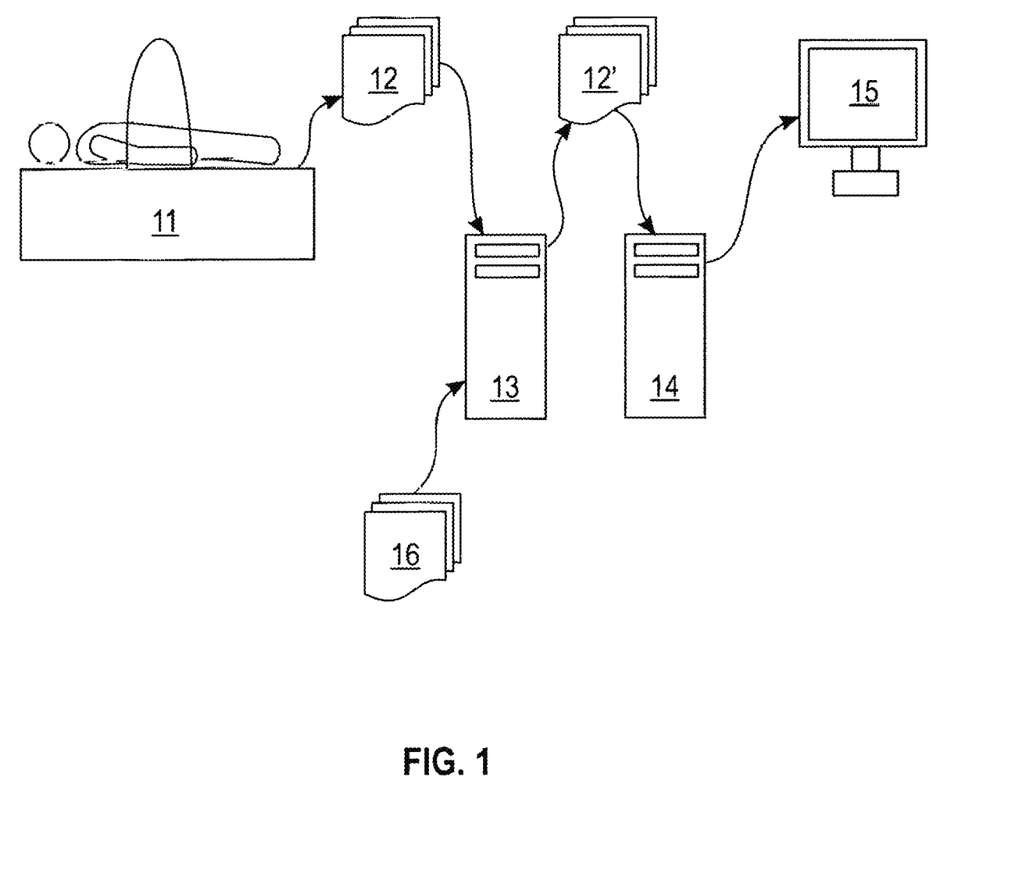
FIG. 1 is a schematic diagram illustrating a system for performing joint registration and segmentation in accordance with exemplary embodiments of the present invention.

FIG. 1 is a schematic diagram illustrating a system for performing joint registration and segmentation in accordance with exemplary embodiments of the present invention. An image scanner 11 may be used to acquire a set of images 12 over a period of time. While exemplary embodiments of the present invention may be primarily described herein with respect to medical images, it is to be understood that the systems and methods described herein may be applied to other types of images, accordingly, while the image scanner 11 may be a medical image scanner such as a CT scanner or an MRI, the image scanner 11 may alternatively be a camera device or other image sensor such as may be disposed within a satellite for taking images of locations on the earth for the purpose of evaluating changes in climate.

The image scanner 11 may acquire the set of images 12 over multiple patient visits and/or at predetermined intervals of days, weeks, years, etc. The set of images 12 may thereafter be provided to a joint registration and segmentation server 13, which may perform JRS in a manner that is described in detail below. The result of this processing may be a set of images that have been registered and segmented 12'. The registered and segmented set of images 12' may then be provided to a computer vision processor 14, which may analyze the registered and segmented set of images 12' so as to characterize a temporal event, which is understood to be a manner in which a condition has changed with respect to time. For example, the temporal event may be the growth of a tumor, which may be used to render a diagnosis. Alternatively, the temporal event may be a change in forest cover, glacier melting, or some other slow-changing environmental event.

The characterization of the temporal event may thereafter be displayed on or otherwise provided to a display terminal 15 so that the results may be observed by a human operator.

The joint registration and segmentation server 13 may utilize a neural network to perform the JRS. This neural network may be trained, beforehand, by training data 16. The training data 16 may include one or more sets of images that have been annotated with both registration results and segmentation results on the same set of images. The images of the sets of images may span a length of time. Each image of the training data 16 may be annotated with both registration results and segmentation results. Accordingly, the neural network may be trained to perform registration and segmentation, simultaneously, as part of a single optimization problem, as will be described in detail below.

Figure 2:
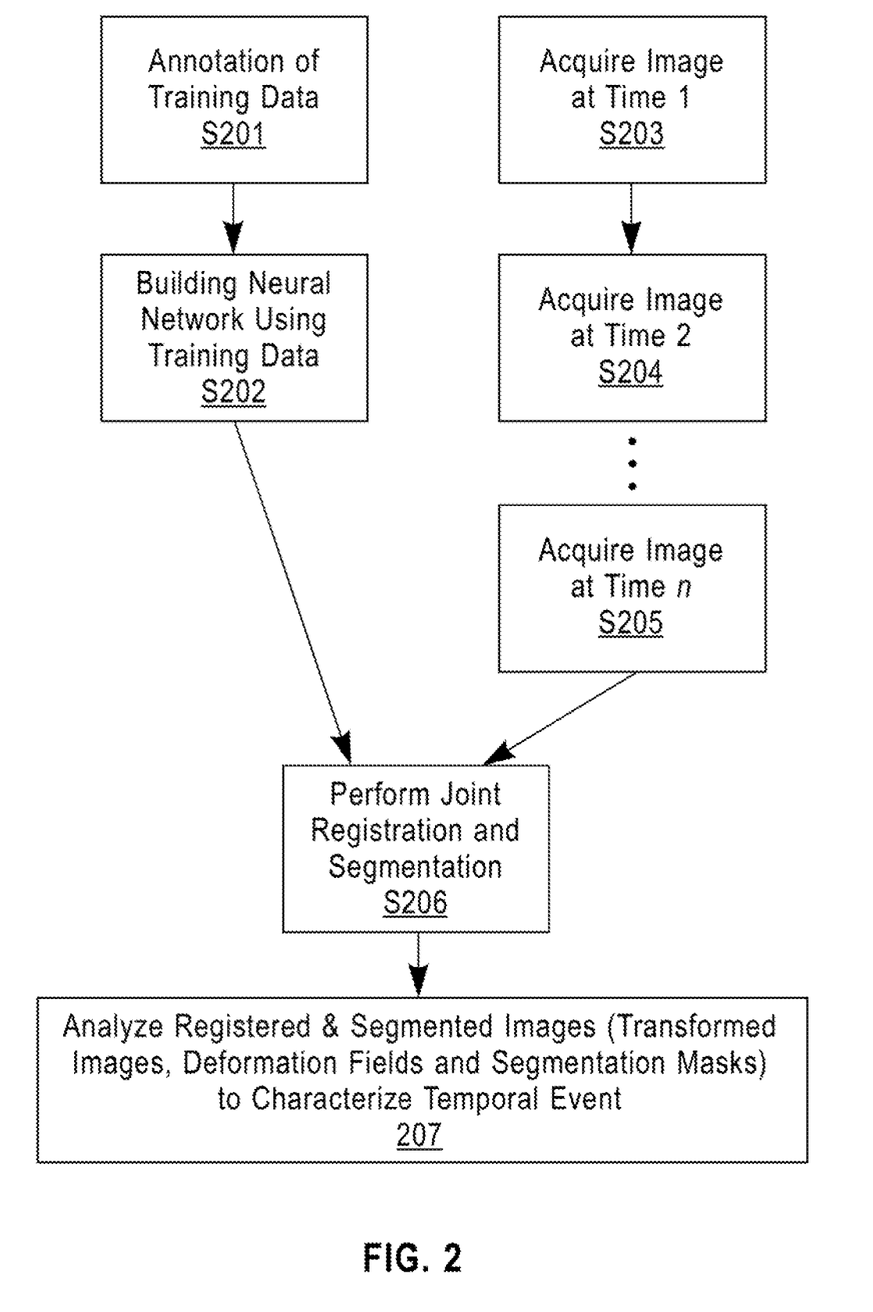
FIG. 2 is a flow chart illustrating a method for performing joint registration and segmentation in accordance with exemplary embodiments of the present invention.

FIG. 2 is a flow chart illustrating a method for performing joint registration and segmentation in accordance with exemplary embodiments of the present invention. First, training data may be annotated (Step S201). The training data may include one or more sequences of images taken over time and each image frame of the training data may be both registered and segmented. For example, the training data may include sets of medical images showing the progression of a tumor. The registration may correspond each image to a common frame of reference while the segmentation delineates various anatomical landmarks and the bounds of the tumor. This training data may then be used to build a neural network (Step S202) or to otherwise train a classifier using various computer learning techniques. The building of the neural network may be one example of constructing an artificial intelligence (AI) environment using deep learning (DL) tools, and other such examples may be used within the spirit of the present disclosure. In either case, the neural network or other DL approach may undergo a training phase in which the training data is used to develop a model or classifier for outputting a registered image and a segmentation mask using the training image data.

A set of images may be acquired over time. This may include acquiring a first image of a subject/object at a first time (Step S203), acquiring a second image of the same subject/object at a second time that is later than the first time (Step S204), and then continuing to acquire images of the subject/object at a desired time interval, through to an n-th image of the subject/object taken at an n-th time (Step S205).

The acquired set of images may then be sent to the joint registration and segmentation server, which may perform joint registration and segmentation on the set of images using the constructed neural network or other DL model/classifier (Step S206).

In performing JRS, a cost function may be defined for registering an image pair based on intensity information and segmentation information. Generative adversarial networks (GANs) may be used to register an image pair. The GANs may take, as input, the training data, which may include pairs of images including a reference image and a floating image. The floating image may then be registered to, or otherwise aligned to, the reference image by transforming the floating image appropriately. A segmentation mask of the reference image may be generated either manually or using a deep learning (DL) based segmentation method. Then, using the reference image, the floating image, and the segmentation mask, the GAN of the registration network outputs the registered image which is a transformed version of the floating image. Simultaneously, the network may also output a segmentation mask of the transformed image.

In performing JRS, the set of images may include a first image, which may be used as a reference image, and a second image, which may be used as a floating image. The output of the JRS would then be a transformed image, a deformation field, and a segmentation mask. Then, a third image may be the new floating image, the second image may be used as the reference image, and the process may be repeated for each image pair. Alternatively, the first image may be used as the reference image for every image frame.

The results of the JRS, which may include the transformed images, the deformation fields, and the segmentation masks, may then be analyzed by the computer vision processor to characterize the nature of the change from image-to-image over time (Step S207). This may include, for example, performing computer-aided diagnosis such as to automatically identify and stage a tumor. This may alternatively include determining a rate of forest growth or recession or quantifying glacier changes.

As previously discussed, according to exemplary embodiments of the present invention, generative adversarial networks (GANs) may be trained to register a floating image to a reference image by combining their segmentation map similarity with feature maps. Intermediate segmentation maps from the GAN's convolution layers may be used in the training stage and to generate the final segmentation mask at test time. JRS may thus be used to provide improved registration and segmentation performance, as compared with solutions that solve registration and segmentation separately.

The JRS architecture, in accordance with exemplary embodiments of the present invention, may take three input images: (1) reference image ($I^{Ref}$); (2) floating image ($I^{Flt}$) to be registered to $I^{Ref}$; and (3) $I^{Ref}_{Seg}$, the segmentation mask of $I^{Ref}$ indicating the organ to be segmented. The outputs are: (1) $I^{Trans}$, the registered image (transformed version of $I^{Flt}$); and (2) $I^{Trans}_{seg}$, the segmentation mask of $I^{Trans}$. The GAN may have two components, a generator network that generates the outputs, and a discriminator network that compares the generated output with the training data. During testing, only the generator network is used.

GANs are generative models trained in an adversarial setting. The generator G outputs a desired image type while a discriminator D outputs a probability of the generated image matching the training data distribution. To generate training data the images are first translated in the left, right, top or bottom direction with a displacement range of +1-

[25,40] pixels. The translated images are rotated by different angles in the range +/−[20,180]° at equal steps of 5°. Finally, the rotated images are subjected to local elastic deformation using B-splines with the pixel displacements in the range of +/−[1,15]. Corresponding segmentation masks are subject to the same transformations to ensure that the Dice Metric (DM) between the original and transformed mask has maximum value of 0.80. The original images are $I^{Ref}$ and the transformed images are $I^{Flt}$. Applying synthetic deformations allows for: (1) accurate quantification of the registration error; and (2) determination of the similarity between $I^{Trans}$ and $I^{Ref}$. The generator G is a feed-forward CNN whose parameters $\theta_G$ are given by:

$$\hat{\theta} = \arg\min_{\theta_G} \frac{1}{N} \sum_{n=1}^{N} l^{JRS}(G_{\theta_G}(I^{Flt}|), I^{Ref}, I^{Flt}, I_{Seg}^{Ref}), \quad (1)$$

where the loss function $l^{JRS}$ combines content loss and adversarial loss, and $G_{\theta_G}(I^{Flt}) = I^{Trans}$ The content loss is $$l_{content}(I^{Trans}, I^{Ref}, I_{Seg}^{Ref}, I_{Seg}^{Trans}) = MSE + [1-SSIM] + VGG + J. \quad (2)$$

Here, MSE denotes intensity mean square error between $I^{Ref}$ and $I^{Trans}$. SSIM denotes structural similarity index metric (SSIM) based on edge distribution and quantifies landmark correspondence between different images. SSIM ∈ [0,1] with higher values indicating greater similarity. Here, VGG is the L2 distance between two images using all 512 feature maps of Relu 4-1 layer of a pre-trained VGG16 network. VGG loss improves robustness since the cost function takes into account multiple feature maps that capture information at different scales. Here, J denotes the Jaccard loss between the segmentation masks and is equal to 1-JI, where JI is the Jaccard index and is defined as:

$$JI = \frac{I_{Seg}^{Ref} \cap I_{Seg}^{Trans}}{I_{Seg}^{Ref} \cup I_{Seg}^{Trans}}$$

Since JRS's objective is to force registration and segmentation to influence each other, JI ensures the registered image incorporates segmentation information between $I^{Ref}$ and $I^{Trans}$ through segmentation mask overlap. Here $I^{Trans}_{seg}$ is obtained on the fly and changes with every training update.

Figure 3A:
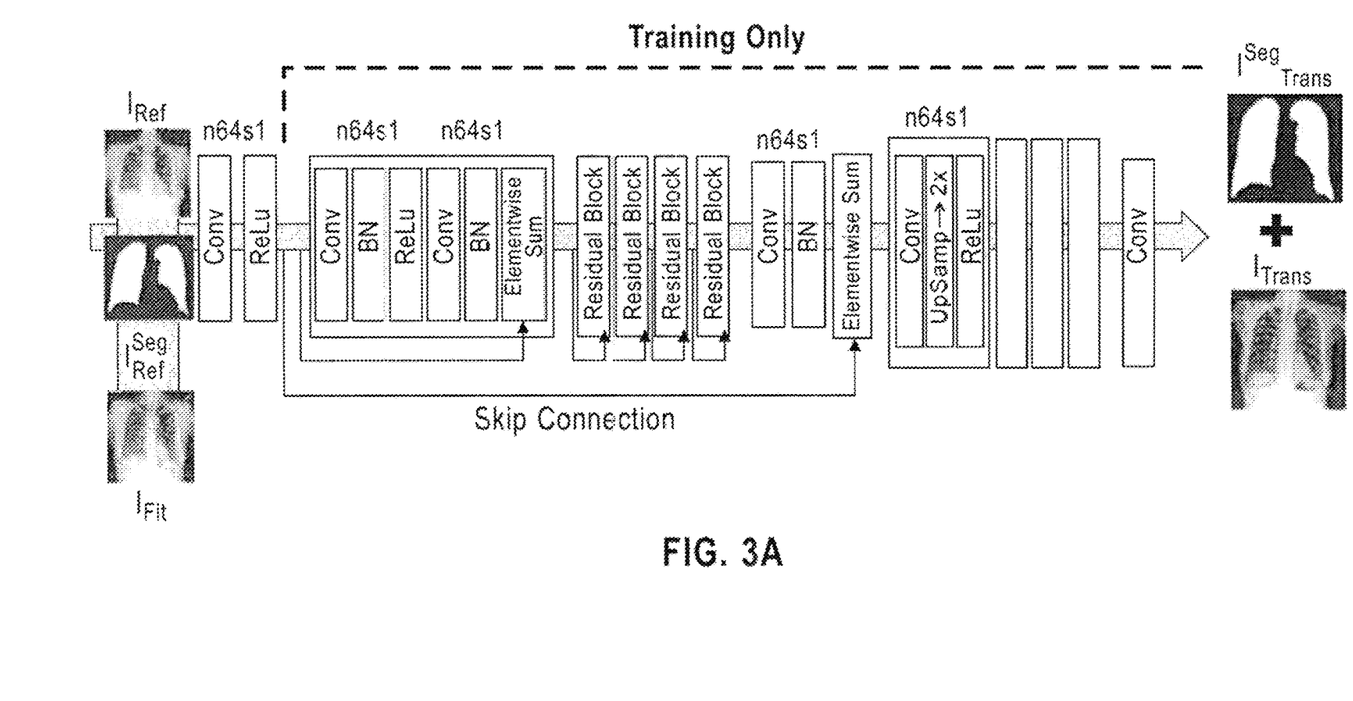
FIGS. 3A and 3B are diagrams illustrating a generator network in accordance with exemplary embodiments of the present invention.
Figure 3B:
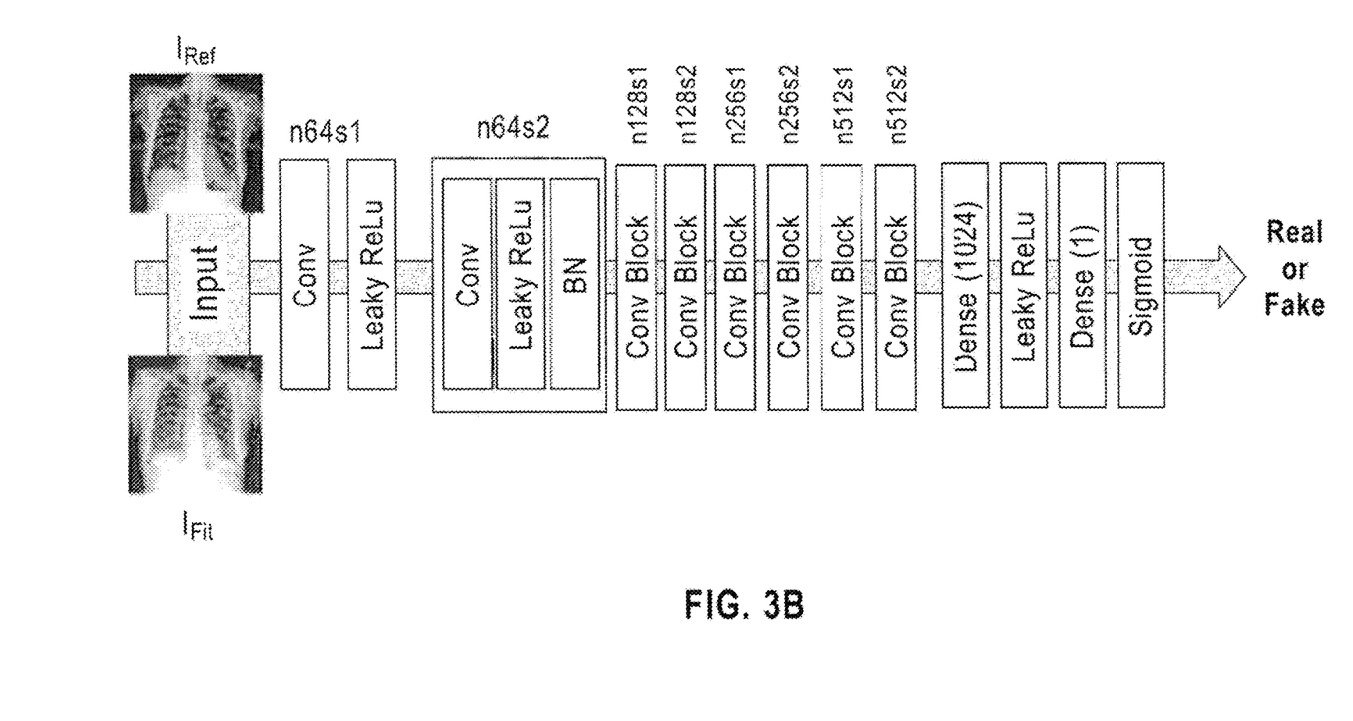

FIGS. 3A and 3B are diagrams illustrating a generator network in accordance with exemplary embodiments of the present invention. As can be seen from FIG. 3A, residual blocks having two convolution layers with 3×3 filters and 64 feature maps, followed by batch normalization and ReLU activation. G also outputs the segmentation mask which is fed back for training. As can be seen by FIG. 3B, the discriminator D has eight convolutional layers with the kernels increasing by a factor of 2 from 64 to 512. Leaky ReLU is used and strided convolutions reduce the image dimension when the number of features is doubled. The resulting 512 feature maps are followed by two dense layers and a final sigmoid activation. D evaluates similarity of intensity distribution between $I^{Trans}$ and $I^{Ref}$.

CycGANs may learn mapping functions G:X→Y and F:Y→X, between image sets $X=I^{Flt}$ and $Y=I^{Ref}$. Adversarial discriminators $D_X$ differentiate between images x and registered images F(y), and $D_Y$ distinguishes between y and G(x). G registers $I^{Flt}$ to $I^{Ref}$ while F registers $I^{Ref}$ to $I^{Flt}$. In addition to the content loss (Equation 2) we have: (1) an adversarial loss to match the distribution of $I^{Trans}$ to $I^{Flt}$; and (2) a cycle consistency loss to ensure transformations G, F do not contradict each other. The adversarial loss function ensures that $I^{Trans}$ has similar intensity distribution as $I^{Flt}$, and is given by:

$$L_{cycGAN}(G,D_Y) = E_{y \in pdata}(y)[\log D_Y(y)] + E_{\chi \in pdata}(\chi) [\log(1-D_Y(G(\chi)))] \quad (3)$$

The notations X, Y are retained for conciseness. There also exists $L_{cycGAN}(F,D_X)$, the corresponding adversarial loss for F and $D_X$.

Cycle consistency loss ensures that for each x∈X, the reverse deformation should bring x back to the original image, i.e. x→G(x)→F(G(x))≈x. Similar constraints may also apply for mapping F and y. This may be achieved using:

$$L_{cyc}(G,F) = E_\chi \|F(G(\chi))-\chi\|_1 + E_y \|G(F(y))-y\|_1, \quad (4)$$

Where the full objective function is:

$$L(G,F,D_{I^{Flt}},D_{I^{Ref}}) = L_{cycGAN}(G,D_{I^{Ref}}) + L_{cycGAN}(F,D_{I^{Flt}}) + l_{content} + \lambda L_{cyc}(G,F) \quad (5)$$

Here, $\lambda=10$ controls the contribution of the two objectives. The optimal parameters are given by:

$$G^*, F^* = \arg\min_{F,G} \max_{D_{I^{FLT}}, D_{I^{Ref}}} L(G, F, D_{I^{Flt}}, D_{I^{Ref}}) \quad (6)$$

The segmentation mask is obtained by concatenating the feature maps of different convolution layers which function as activation maps highlighting informative parts of the image. A weighted combination (using the learned weights) gives a final activation map which is thresholded to give the segmentation mask. Methods such as UNet may modify the FCN architecture to add skip connections between corresponding layers of the upsampling and downsampling path to get the final segmentation. Since neither max pooling nor downsampling are employed in G, all output activation maps are of the same dimension and are directly combined to get the segmentation mask.

Figure 4:
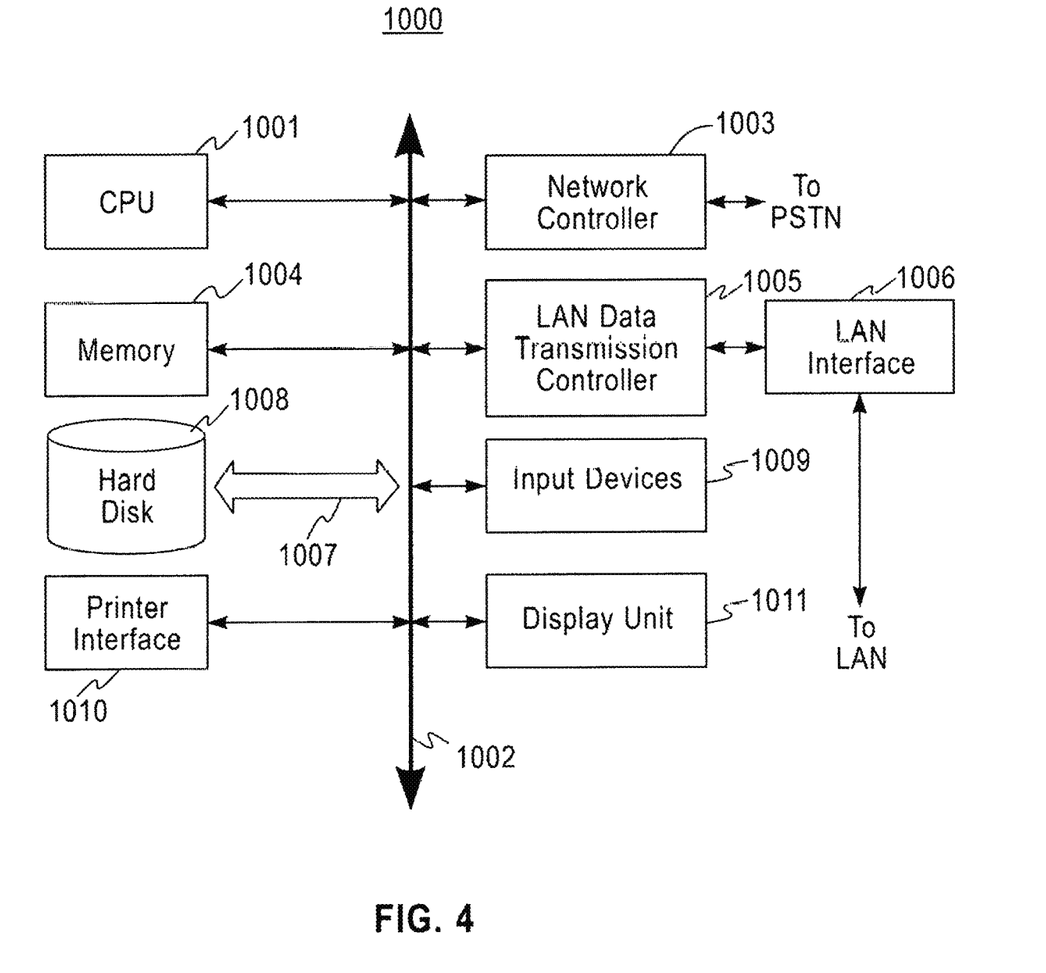
FIG. 4 shows an example of a computer system capable of implementing the method and apparatus according to embodiments of the present disclosure.

FIG. 4 shows another example of a system in accordance with some embodiments of the present invention. By way of overview, some embodiments of the present invention may be implemented in the form of a software application running on one or more (e.g., a "cloud" of) computer system(s), for example, mainframe(s), personal computer(s) (PC), handheld computer(s), client(s), server(s), peer-devices, etc. The software application may be implemented as computer readable/executable instructions stored on a computer readable storage media (discussed in more detail below) that is locally accessible by the computer system and/or remotely accessible via a hard wired or wireless connection to a network, for example, a local area network, or the Internet.

Referring now to FIG. 4, a computer system (referred to generally as system 1000) may include, for example, a processor e.g., central processing unit (CPU) 1001, memory 1004 such as a random access memory (RAM), a printer interface 1010, a display unit 1011, a local area network (LAN) data transmission controller 1005, which is operably coupled to a LAN interface 1006 which can be further coupled to a LAN, a network controller 1003 that may provide for communication with a Public Switched Telephone Network (PSTN), one or more input devices 1009, for example, a keyboard, mouse etc., and a bus 1002 for operably connecting various subsystems/components. As shown, the system 1000 may also be connected via a link 1007 to a non-volatile data store, for example, hard disk, 1008.

In some embodiments, a software application is stored in memory 1004 that when executed by CPU 1001, causes the system to perform a computer-implemented method in accordance with some embodiments of the present invention, e.g., one or more features of the methods, described with reference to FIG. 2.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Exemplary embodiments described herein are illustrative, and many variations can be introduced without departing from the spirit of the invention or from the scope of the appended claims. For example, elements and/or features of different exemplary embodiments may be combined with each other and/or substituted for each other within the scope of this invention and appended claims.

What is claimed is:

1. A system for registering and segmenting images, comprising:
   an image scanner configured to acquire an image pair including a first image at a first time and a second image at a second time that is after the first time;
   a joint registration and segmentation server configured to receive the image pair from the image scanner and to simultaneously and concurrently joint registration and segmentation on the image pair as part of a single optimization problem using a single deep learning framework;
   a computer vision processor configured to receive an output of the joint registration and segmentation server and to characterize how a condition has progressed from the first time to the second time therefrom; and
   a user terminal configured to present the characterization to a user.

2. The system of claim 1, wherein the image scanner is a computed tomography (CT) scanner, a magnetic resonance imager (MRI), a camera, or a satellite-based imager.

3. The system of claim 1, wherein the first time and the second time are at different days and the first image and the second image are acquired in distinct imaging sessions.

4. The system of claim 1, wherein the joint registration and segmentation server is configured to perform joint registration and segmentation on the image pair using a neural network that has been trained, before the acquisition of the first and second images, using training data.

5. The system of claim 4, wherein the neural network includes generative adversarial networks (GANs) which may use one of the first and second images as a floating image and the other of the first and second images as a reference image.

6. The system of claim 1, wherein the output of the joint registration and segmentation server includes a segmentation mask and a registered image.

7. The system of claim 1, wherein the computer vision processor is configured to perform computer-aided diagnosis.

8. The system of claim 1, Wherein the user terminal includes a display device for displaying the characterization to the user.

9. A method for registering and segmenting images, comprising:
   acquiring an image pair including a first image at a first time and a second image at a second time that is after the first time;
   simultaneously and concurrently performing joint registration and segmentation on the image pair as part of a single optimization problem using a single deep learning framework; and
   characterizing how a condition has progressed from the first time to the second time from a result of the joint registration and. segmentation of the image pair.

10. The method of claim 9, wherein the first and second images are computed tomography (CT) images, magnetic resonance imager (MRI) images, camera images, or satellite images.

11. The method of claim 9, wherein the first time and the second time are at different days and the first image and the second image are acquired in distinct imaging sessions.

12. The method of claim 9, wherein the joint registration and segmentation is performed on the image pair using a neural network that has been trained, before the acquisition of the first and second images, using training data.

13. The method of claim 12, wherein the neural network includes generative adversarial networks (GANs) which may use one of the first and second images as a floating image and the other of the first and second images as a reference image.

14. The method of claim 9, wherein the result of the joint registration and segmentation of the image pair includes a segmentation mask and a registered image.

15. The method of claim 9, wherein the characterizing of how the condition has progressed from the first time to the second time is part of a computer-aided diagnosis.

16. A computer program product for registering and segmenting images, the computer program product comprising a computer readable storage medium having program instructions embodied therewith, the program instructions executable by a computer to cause the computer to:
   simultaneously and concurrently performing, by the computer, joint registration and segmentation on an image pair as part of a single optimization problem using a single deep learning framework, the image pair including a first image at a first time and a second image at a second time that is after the first time; and
   characterizing, by the computer, how a condition has progressed from the first time to the second time from a result of the joint registration and segmentation of the image pair.

17. The computer program product of claim 16, wherein the first and second images are computed tomography (CT) images, magnetic resonance imager (MRI) images, camera images, or satellite images.

18. The computer program product of claim 16, wherein the joint registration. and segmentation is performed on the image pair using a neural network that has been trained, before the acquisition of the first and second images, using training data.

19. The computer program product of claim 18, wherein the neural network includes generative adversarial networks (GANs) which may use one of the first and second images as a floating image and the other of the first and second images as a reference image.

20. The computer program product of claim 16, wherein the result of the joint registration and segmentation of the image pair includes a segmentation mask and a registered image.

* * * * *